S. W. WARDWELL.
STOP DEVICE FOR BRAIDING MACHINES.
APPLICATION FILED MAY 3, 1909.

1,007,904.

Patented Nov. 7, 1911.
5 SHEETS—SHEET 1.

WITNESSES
J. J. McCarthy
M. G. Crandell

INVENTOR
Simon W. Wardwell
BY
Foster Freeman Watson & Cort
ATTORNEYS

S. W. WARDWELL.
STOP DEVICE FOR BRAIDING MACHINES.
APPLICATION FILED MAY 3, 1909.

1,007,904.

Patented Nov. 7, 1911.
6 SHEETS—SHEET 4.

UNITED STATES PATENT OFFICE.

SIMON W. WARDWELL, OF PROVIDENCE, RHODE ISLAND.

STOP DEVICE FOR BRAIDING-MACHINES.

1,007,904.     Specification of Letters Patent.     Patented Nov. 7, 1911.

Application filed May 3, 1909. Serial No. 493,718.

*To all whom it may concern:*

Be it known that I, SIMON W. WARDWELL, a citizen of the United States, residing at Providence, in the county of Providence and State of Rhode Island, have invented certain new and useful Improvements in Stop Devices for Braiding-Machines, of which the following is a specification.

My invention relates to stop devices for braiding machines and its purpose is to more effectively arrest the machine's action after withdrawal of driving action and insure such relation of the brake devices to the driving devices that there shall be no brake effect before the driving action ceases and no driving action before the brakes are entirely withdrawn, the contrary causing undue wear and deterioration.

The construction and mode of operation of my invention are fully disclosed in the following specification and accompanying drawings which respectively represent.

My invention is shown as applied to the machine which is subject of my application for Letters Patent for a braiding machine, filed concurrently herewith, Serial No. 493,716.

Figures 1, 2, 7, 8:
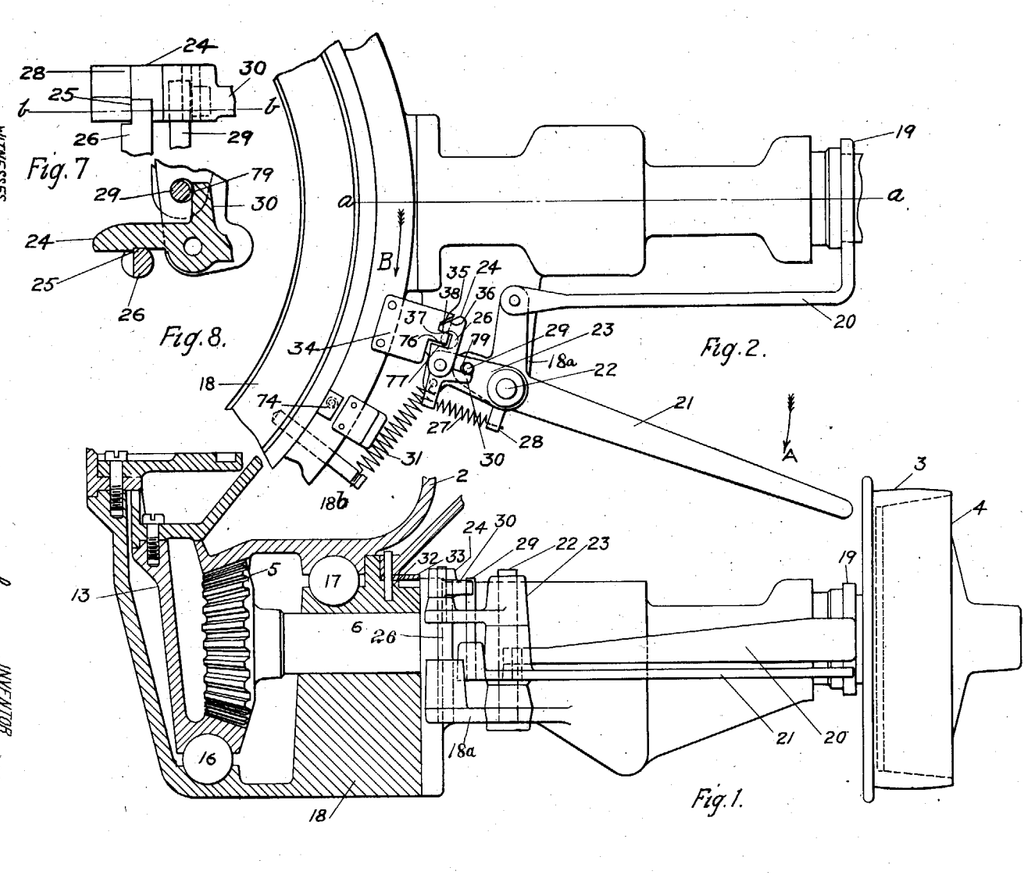
Figure 1, a part sectional view of the braiding machine showing the driving mechanism, in part section on the line $a$—$a$ of Fig. 2.
Fig. 2, a plan view of the same.
Figs. 4, 5, 6, 7, 8, 9, 10 and 11, miscellaneous details of construction, Fig. 8 being sectional of Fig. 7 on the line $b$—$b$.
Figures 3, 9, 10, 11:
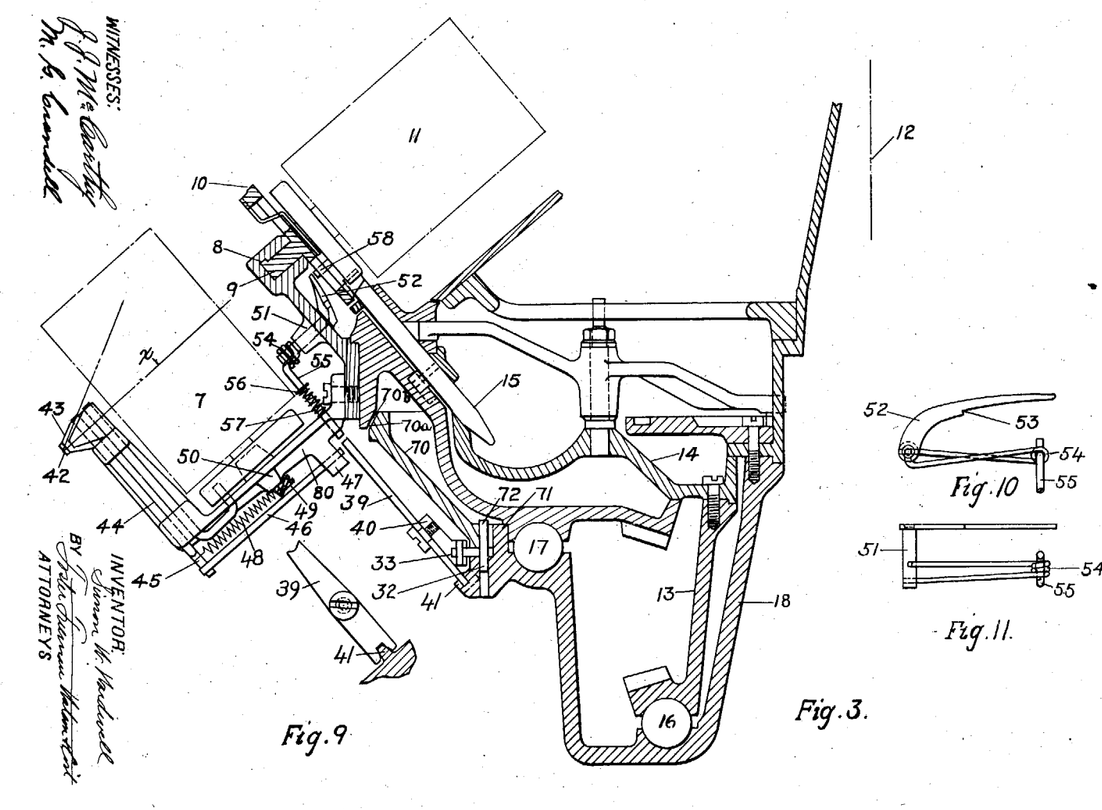
Fig. 3, a sectional view showing the supplies and clutch parts and means for operating the latter.
Figure 4:
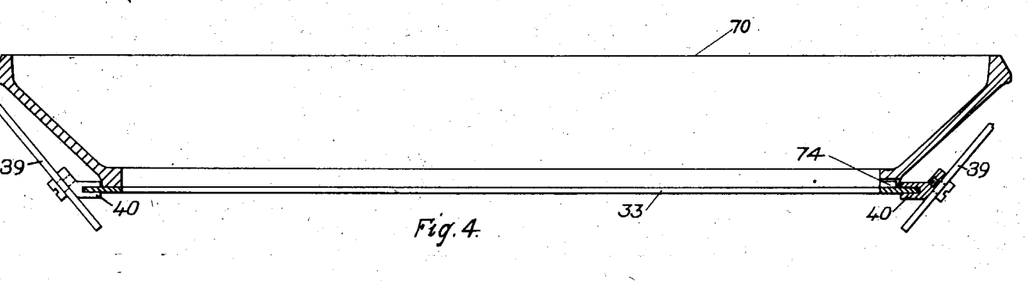

The outer turret 2 is driven from the pulley 3, through the clutch 4 by the gear 5 which is preferably on the same shaft 6 with said pulley—Fig. 1. The clutch 4 is secured to the shaft, while the pulley 5 can run freely thereon when disengaged from the clutch. On the outer turret 2 are mounted the yarn supplies of the lower tier (one of which is shown at 7—Fig. 3) with their tension controlling devices and appertaining elements. In the outer turret 2 is also formed a raceway 8 for the runner 9 of each of the carriers for the supplies of the upper tier, one of which with a carrier 10 is shown at 11. These carriers revolve about the axis of the braiding machine, represented by the broken line 12, in a direction opposite to that of the outer turret 2, their movement being concordant with that of the inner turret 13 which also is driven by the gear 5, as shown in Fig. 1. On the inner turret 13 a head 14 is secured, to rotate with the same, carrying drivers, one of which, 15, is shown in Fig. 3, that engage and propel the carriers. The precise arrangement and action of these drivers is not here set forth because they are fully described in the companion application referred to and because their action does not directly concern the present invention.

Both the inner turret and the outer turret are preferably mounted on ball bearings, 16 and 17 respectively, the supporting ball races being in the frame 18 of the machine. Rotation of the gear 5 obviously secures concurrent rotation of the two turrets in opposite direction and revolution in opposite direction of the upper and lower tiers of yarn supplies.

The clutch 4 is preferably of the friction type and is controlled in position by the yoke 19 on the arm 20. The latter is connected with the controlling handle 21 which is fulcrumed on the stud 22. Mounted on the same stud is a lever 23 which carries a latch 24, which in turn engages, by a shoulder 25 at its lower portion, the detent pin 26—Figs. 7 and 8. The detent pin 26 is driven into an overhanging portion 18$^{a}$ of the frame 18, see Fig. 2. The latch is held in position to engage the detent pin 26 by the spring 27, suitably anchored, as for example, to the projection 28. The lever 23 is connected to move with the controlling handle 21 by a pin 29 mounted in said handle, but has a limited movement independent of the controlling handle because the aperture 79 in it, through which the pin 29 passes, is larger than the pin. The pin 29 further serves as an abutment to limit the action of the latch 24 which has a projection 30 to encounter the pin. The specific purpose of this arrangement is actually to maintain the latch 24 in operative engagement with the controlling handle 21, so that the latch may be moved independently of the lever 23 on which it is mounted.

The machine is started manually by moving the controlling handle 21 in the direction of the arrow A. This, through the arm 20 engages the pulley 3 with its clutch and through the pin 29 shifts the lever 23 to engage the latch 24 with its detent pin 26. To throw off the power manually the controlling handle 21 is shifted in the reverse direction from that indicated by the arrow A. The pin 29 acting on the projection or stop 30 disengages the latch 24 from its detent pin 26. The lever 23 is then moved by the spring 31 which is anchored to the frame 18 by a pin or other projection 18ᵇ and acting on the controlling handle 21 through the pin 29 withdraws and withholds the clutch 4 from the pulley 3. The same action is secured automatically through the following means. On a shoulder 32 of the frame 18 is a ring 33 connected with the latch 24, through a projection 34 preferably a block secured to the ring. This block has an inclined or wedge surface 35 corresponding with a similar surface 36 on the latch 24. It has also a substantially radial surface 37 which engages a corresponding shoulder 38 on the latch 24, in line with but above the shoulder 25. When the ring 33 is moved in the direction of the arrow B the end of the latch 24 is, through coaction of the surfaces 35 and 36, wedged or forced radially away from the ring and out of engagement with its detent pin 26. Thereupon, the lever 23 is moved by the spring 31, carrying with it the controlling handle 21, and thereby disengaging the clutch 4 from its pulley 3.

Figure 14:
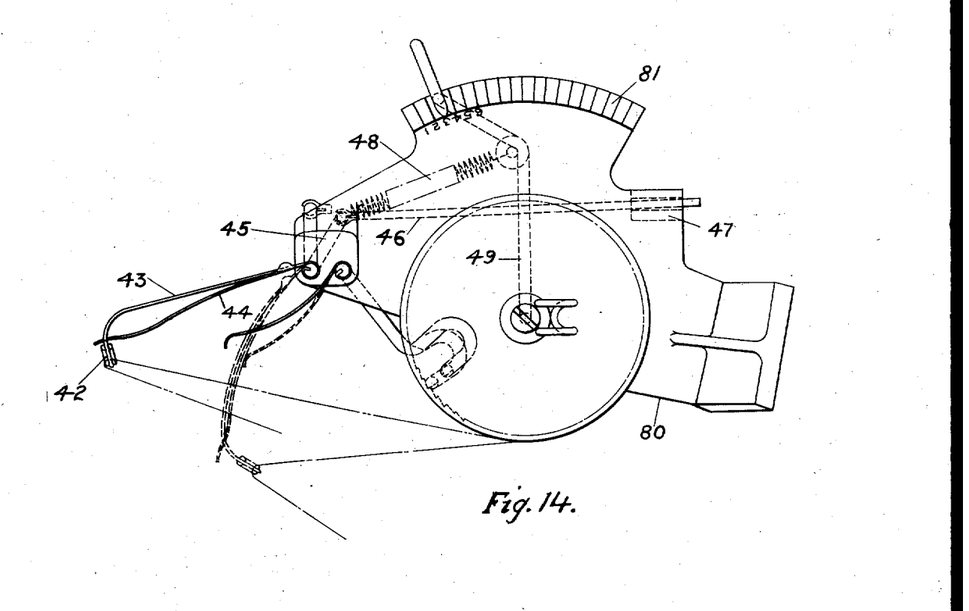
Fig. 14, a plan view of the supply holder and bracket for the lever supply 7.

It is to be observed that the lower detent shoulder 25 of the latch 24 is slight and has but little engagement with its pin 26, while the upper shoulder 38 is of substantial proportions and bearing on the surface 37 of the block 34, so that a movement of the latch 24 sufficient to disengage its pin 26 is not enough to disengage the block 34, and therefore movement of the latch 24 in the direction of the arrow B will be accompanied by a movement of the ring to a definite extent whenever the latch is operated, for purposes to be explained later. In short, whether the latch 24 be disengaged from its detent pin manually through operation of the controlling handle 21, or by movement of the ring 33 even though slight, a complete movement of the ring 33 is insured through its prescribed range of action. The block 34 has another shoulder 76 which is opposed to a corresponding shoulder 77 on the latch 24. When the controlling handle 21 is moved manually to start the machine, positive movement of the ring 33 is insured through engagement of the latch 24 and the block 34 by their shoulders 77 and 76 respectively. The ring 33 is moved through the instrumentality of levers, one of which 39 is shown in Fig. 3, fulcrumed on the stand 40 which is secured to the ring. The lower end of this lever is forked and straddles the projection 41, Fig. 9. Movement of the lever 39 acts with a prying effect to move the ring 33 and effect the action upon the latch 24 and clutch 4 above described. Such movement of the lever 39 occurs automatically upon breakage, exhaustion or undue slacking of a yarn from any of the lower supplies, as follows: The lower yarn $x$ is rendered through a guide eye 42 to the braiding. This guide eye is mounted in a flexible arm 43 which by its resiliency maintains the yarn taut under variations of tension due to said yarn passing over and under the upper yarn supplies 11. The arm 43 is secured to a rock shaft 44 at the bottom end of which is a crank 45. From the crank a rod or feeler 46 extends through the bearing 47 toward the lever 39 and is projected toward said lever by the spring 48, Fig. 14. The said spring is anchored to a lever 49 mounted, preferably in the hub 50 of the tension bracket 80 on which the supply 7 is mounted. The outer extremity of the lever engages the detent teeth 81 of the bracket, and by varying the location of the lever in these teeth the power of the spring 48 can be varied. Under proper tension of the yarn $x$, the guide arm 43 and with it the crank 45 are held in such position that the feeler 46 is withheld from engaging the lever 39.

Adjustment of the spring 48 accommodates the action of the feeler 46 under impulse of the spring, to the particular yarn tension required. If a very soft braiding is desired the spring 48 can be reduced in tension to such extent that a slight yarn tension serves to withhold the rod 46 from active engagement with the lever 39. On the other hand, the tension of the spring 48 can be so increased that only a very strong yarn, under heavy tension, will suffice to hold the feeler 46 from such engagement. Should the yarn in any case become unduly slack or exhausted or should it break, the feeler 46 will be released and, projected by the spring 48 to such position that, as it revolves with its yarn supply about the machine axis 12, engagement will be made with the lever 39, and the ring 33 will be moved to act upon the clutch mechanism as described. Stopping of the machine is similarly effected from the upper tier of yarn supplies. The outer turret has a series of rockers, one of which is shown at 51, Fig. 3. At the inner end of this rocker is a curved arm 52, having on its under side a distinct shoulder 53, Fig. 10. At the outer end of the rocker is an arm 54 from the extremity of which depends a finger 55, Fig. 11. On this finger is a shoulder made by forcing on a ring 56, and between this shoulder and the bearing through which the feeler passes is a compression spring 57 which forces the finger 55 upward. The latter is in such position that if depressed it engages the lever 39 in the same manner as does the feeler 46 controlled by yarn $x$ from the lower supply.

This finger with its rocker is mounted on the outer turret and acts as an intermediary between the lever 39 and the carriers 10. Such intermediation is essential because the carriers run in a direction opposite to that of the lower supplies which go with the outer turret, and the stopping agencies of both the upper and lower tier of supplies must act in the same direction on the lever 39 inasmuch as only motion of this lever in one direction will serve to actuate the clutch and brake mechanism.

Figures 5, 6:
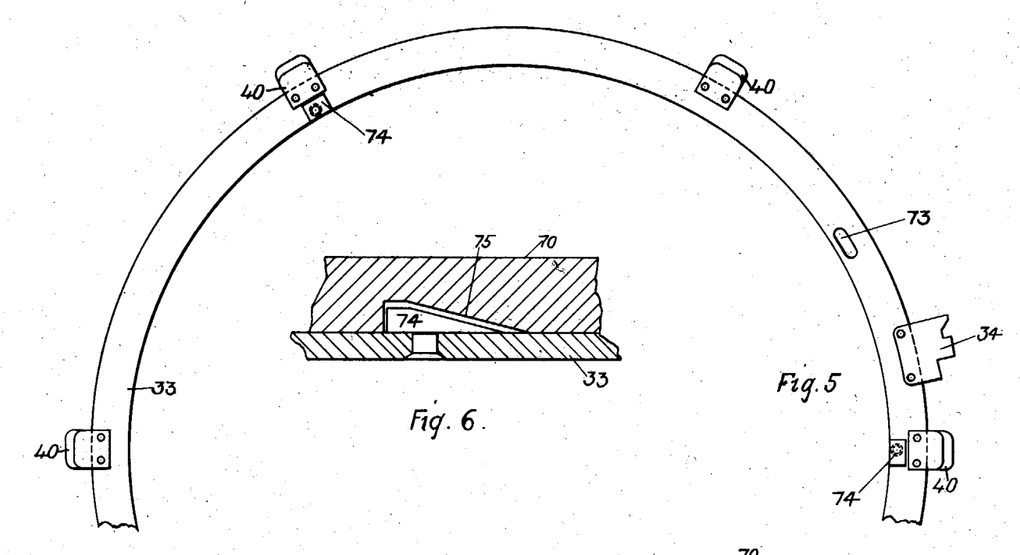
Figure 12:
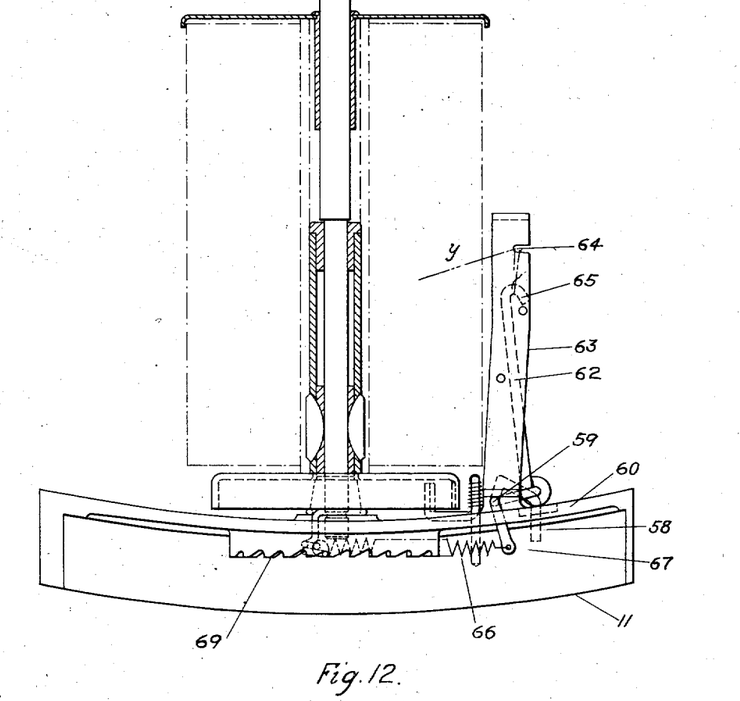
Figs. 12 and 13, elevation and plan views of a carrier on a larger scale.
Figure 13:
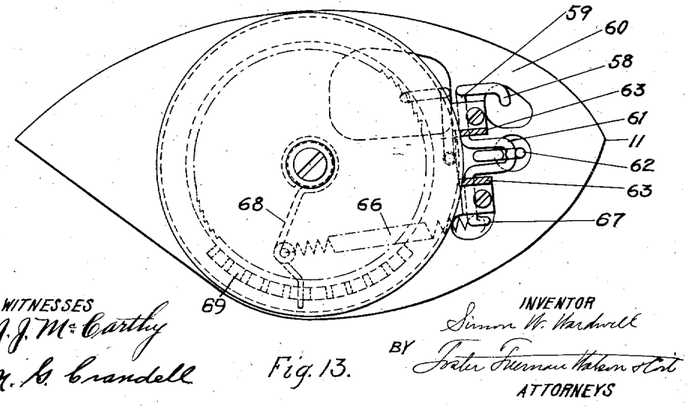

The rocker 51 is actuated by a feeler 58 which is one arm of a rocker 59 mounted in suitable bearings on the deck 60 of the carrier 11, as is more clearly shown in Figs. 12 and 13. On a crank 61 of this rocker is a detector 62 which extends upward between the sides of the arched standard 63. In these sides are threadways 64 through which the yarn $y$ passes, engaging the hooked upper end 65 of the detector 62. The detector tends downward under influence of the spring 66 which engages the arm 67 at the opposite end of the rocker 59 from the feeler 58 and, like the corresponding spring 48 of the bottom tier, is anchored to a swinging arm 68 which can be engaged with any one of a series of graduated notches 69. The tension of the upper yarn $y$ upholds the detector 62 against the reaction of the spring 66, and in case the tension relaxes unduly, or the yarn breaks or becomes exhausted from the supply, then the detector yields to the spring and the feeler 58 is projected to a position where, by the travel of the carrier 11, it encounters the curved upper edge of the arm 52 of the rocker 51 turning the latter and forcing the finger 55 to engage and move the lever 39 in the same manner as does the feeler 46 before described. The two tiers of supplies are so related that in their revolution they reach corresponding positions in their respective orbits, when approaching one of the levers 39, so that depression of the finger 55 will occur at a time when it will encounter and act upon the lever 39. To further insure such encounter and action, the arm 52 is elongated so that when engaged by the feeler 58, such engagement is continued to maintain the finger 55 depressed. Should the machine be turned backward, either through accident or for any purpose, the feeler 58, if in the path of the arm 52, encounters the shoulder 53 thereof and is rocked back by it, so as to "wipe" over the arm 52 without damage. The actions thus described as ensuing from an improper delivery of the under yarn $x$ and the upper yarn $y$ or either of them, effects only a suspension or withdrawal of the driving power applied to the machine for its operation. To be effective as a stopping device and adequately control the machine under such circumstances it is essential that means be provided to overcome the momentum acquired by the rapidly moving parts and quickly arrest their motion. This is accomplished by the ring 33, through the agency of the superposed ring 70 which fits the annulus 71 of the main frame, and is prevented from turning by pins, one of which 72, shown in Fig. 3, extends from the shoulder 32 up through the ring 33. The latter has elongated openings, one shown at 73, see Fig. 5, through which the pin 72 extends, admitting a movement of the ring 33 sufficient for the clutching and unclutching action already described. On the ring 33 are wedges 74 which engage corresponding wedge surfaces 75 on the brake ring 70, which is indicated by the sectional view, Fig. 6. These are so disposed that when the ring 33 turns in the direction reverse of the arrow B (Fig. 2) to unclutch the machine from its driver, the brake ring 70 is raised. The upper edge of the brake ring 70 is formed preferably with a bevel or taper $70^a$ which meets a corresponding bevel $70^b$ on the outer turret, when raised, and not only lifts the turret from its ball bearing, but opposes its rotation with an intensity dependent on the inclination of the bevel and upon the weight of the turret and the parts which it sustains. The relation of the wedges 74 to their coacting surfaces 75 is such that when the machine is started, the wedges are first fully withdrawn from the brake ring 70 and then the pulley 3 engaged with its clutch 4; and vice versa, when the machine is stopped, either manually or automatically, it is first disengaged from its clutch and then the brake is applied. Thus, there is avoided that unnecessary wear that inevitably ensues where power is permitted to act before the braking action is entirely at an end, or where brakes are applied before driving action entirely ceases.

Without limiting myself to the precise form and arrangement of the device, I claim:

1. In a stop device for braiding machines, the combination with two tiers of yarn supplies, a moving support for both tiers, a fixed bearing for said supports, drivers to propel one tier in a direction opposite to that of the other and a wheel through which the drivers are actuated and both tiers revolved, of means to discontinue the action of the wheel on the supplies and drivers, a non-rotative bearing which concurrently with such discontinuance is elevated to engage and raise the movable support aforesaid, a rotative member engaging the non-rotating bearing to raise the same, and connections between the rotative member and the discontinuing means to effect their coaction.

2. In a stop device for braiding machines, the combination with two tiers of spindles, a rotating support for both tiers, a fixed bearing for said support, drivers to propel one tier of supplies with a direction of revolution opposite to that of the other tier, and driving means to rotate the support and operate the drivers, of a non-rotatable ring movable to and from the support and having wedge portions, a rotatable ring having corresponding wedge portions, instrumentalities for withdrawing and withholding from action the driving means and connections between said instrumentalities and said rotatable ring to engage the non-rotatable ring with the rotating support after the driving action has been withdrawn and disengage it from said support before the driving action is applied.

3. In a stop device for braiding machines, the combination with a driving wheel, revolving supplies driven by the wheel, and a rotating turret to carry the supplies, of means to discontinue the driving action, a brake engageable with the turret to stop the supplies, a ring engaging the brake and movable to actuate the same, and connections through which the ring in its movement operates the discontinuing means to cause action of the latter before application of the brake.

4. In a stop device for braiding machines, the combination with driving means therefor and revolving supplies, of means to discontinue the driving action, a brake ring 70 having wedge portions 75, a ring 33 having wedges 74 to act with the wedge portions 75 to operate the brake ring, connections between the ring 33 and the means for discontinuing driving action to secure coöperation of the two, and a lever 39 on the ring 33 to shift the latter rotatively to bring the wedges 74 and 75 into engagement, said lever actuated from means controlled by the yarn delivered by the supplies.

5. In a stop device for a braiding machine, the combination with the main frame 18 having an annulus 71 and shoulder 32, revolving yarn supplies, a turret 2 to support the yarn supplies and mounted on the frame, an inner turret to propel a portion of the supplies and means to drive the machine, of means to connect and disconnect said driving means, a ring 33 supported on the shoulder 32, susceptible of rotative motion and having wedges 74, a brake ring 70 fitting the annulus 71 above the ring 33, non-rotatable but having vertical movement, and with wedge portions 75, connections between the means for connecting and disconnecting the driving means and the ring 33 whereby the latter is moved to lift (through co-action of its wedges 74 with the wedge portions 75) the ring 70 to engage and lift the turret 2 when the driving means is disconnected, and when the driving action is effected, is moved to permit the ring 70 to withdraw from the turret 2, and a lever 39 on the ring 33 whereby the latter is moved from action of a yarn from the supplies, to shift the ring 33 to disconnect the driving means and apply the brake.

6. In a stop device for a braiding machine, the combination with usual braiding mechanism and yarn supplies, a clutch system to control the driving action upon the machine including a controlling handle 21, and a brake to overcome the momentum of the machine when the driving action is arrested, of a lever 23 mounted with the controlling handle, and connected therewith by a pin 29 to have a limited movement independent of the controlling handle, a latch 24 on the lever 23 and operatively connected with the brake system, a fixed detent 26 to be engaged by the latch, to maintain the clutch system in action, a spring 27 to maintain the latch in engageable relation with the detent and operative contact with the pin 29 whereby it may be disengaged from its detent by action of the operating handle, and means to shift the lever 23 on release of the latch 24 to arrest the action of the clutch system and cause action of the brake system.

7. In a stop device for a braiding machine, the combination with driving devices and controlling handle therefor, of a lever 23 connected to move with the controlling handle and to have a movement independent thereof, a detent 26, and a latch 24 movable by the controlling handle, with the lever 23 to engage the detent, and movable by the controlling handle independently of the lever 23 to disengage the detent to respectively connect or disconnect the driving devices.

8. In a stop device for a braiding machine, the combination with driving devices and controlling handle therefor, and a brake to coöperate with the driving devices and controlling handle, of a detent 26, and of a latch 24 adapted to engage the handle and brake and movable by the controlling handle to engage the detent 26 to maintain the driving devices in action and the brake inactive, and likewise movable by said controlling handle to cause inaction of the driving devices and action of the brake.

9. In a stop device for a braiding machine, the combination with driving means, of means to connect and disconnect said driving means with the machine, a brake, a ring to operate the brake, a detent 26, a latch 24 adapted to engage the detent to maintain the driving means in connection with the machine, said latch having a wedge portion 36 adapted to be engaged by the ring when the latter is moved to apply the brake to cause disengagement of the latch from its detent, and means to cause the action of the disconnecting means for the driving devices upon such disengagement of the latch.

10. In a stop device for a braiding machine, the combination with driving devices, means to connect and disconnect the driving devices, controlling handle therefor and brake, of a ring to operate the brake and having a wedge portion 35 and a shoulder 37, a detent, a latch 24 engaging the detent to maintain the driving devices connected, having a wedge portion 36 which by coaction with the wedge portion 35 of the ring disengages the latch from its detent and causes the disconnection of the driving means, and a shoulder 38 upon which the ring acts by its shoulder 37 to cause action of the disconnecting means for the driving means and which in turn acts upon the shoulder 37 to return the ring to normal position when the latch is reëngaged with its detent to cause connection of the driving means.

11. In a stop device for a braiding machine, the combination with driving devices, controlling handle therefor and brake, of a ring to operate the brake having shoulders 37 and 76, a detent, a latch 24 engaging the detent to maintain the driving means in connection with the machine, having a projection whereby it is moved from the controlling handle to disengage its detent, a shoulder 38 whereby it engages the shoulder 37 of the ring to move the latter to apply the brake and a shoulder 77 to engage the shoulder 76 of the ring to shift the latter to withdraw the brake when the latch is reëngaged with its detent to maintain the driving means in connection with the machine.

12. In a stop device for a braiding machine, the combination with driving devices, brake devices and controlling handle therefor having a projection 29, of a lever 23 with an aperture 79 to receive the projection but of such size as to permit movement of the lever 23 with respect to the pin, a latch mounted on the lever 23 and a detent 26 by which the latch is engaged to maintain in action the driving devices and withhold from action the brake devices, and a spring to cause cessation of action of the driving devices and action of the brake devices when the latch is disengaged.

13. In a stop device for braiding machines, the combination with the driving and brake devices and means for actuating the same, of a carrier with a yarn supply, a feeler to operatively engage the driving and brake actuating devices embodied in a rocker 59, a detector 62 connected with said rocker and upheld by the yarn from the supply under normal tension to withhold the feeler from engaging the driving and brake actuating devices, means to project the feeler into operative engagement with the driving and brake actuating devices when the tension on the yarn is relaxed, and adjustable means to determine the degree of yarn tension requisite to prevent such operative action of the feeler.

14. In a stop device for a braiding machine, the combination with the driving and brake devices and means for actuating the same, of a carrier with a yarn supply, a feeler to operatively engage the driving and brake actuating devices embodied in a rocker 59 having a crank 61, an arched standard 63 within which is said crank and having threadways 64 through which the yarn from the supply passes, a detector 62 mounted on the crank of the rocker and engaging the yarn passing through the threadways, upheld by the normal tension of the yarn to withhold the feeler from engaging the driving and brake actuating mechanism, a spring to project the feeler into operative engagement with the driving and brake actuating devices when the tension on the yarn is relaxed and a lever to which the spring is anchored, variable in position to vary the tension under which the feeler shall act.

15. In a stop device for a braiding machine, the combination with braiding devices including the turret 2, a supply of the lower tier, and a supply of the upper tier with its carrier 11, driving devices including the pulley 3, its clutch 4 and controlling instrumentalities for causing action or cessation from action of the driving devices, and brake means connected with said controlling instrumentalities including a non-revoluble lever 39, of a rocker 51 mounted in the turret, having an inner arm 52, and an outer arm 54, a finger 55 on the said outer arm movable to engage the lever 39, and means to withhold the finger from such engagement, a feeler on the carrier controlled by the yarn of the carrier, means to move the feeler of the carrier to engage the rocker by its inner arm to engage said finger with the lever 39 when the control of the yarn relaxes, a feeler to directly engage the lever 39 and withheld from such engagement by the yarn of the lower supply, and means to effect such engagement by the feeler when said yarn of the lower supply is unduly relaxed.

16. In a stop device for braiding machines, the combination with the rotating turret 2 and the two tiers of supplies thereon oppositely revolved about the machine's axis, of a non-rotating brake ring 69, a lever 39 to operate the brake ring, a feeler 46 restrained from engagement with the lever 39 by a yarn from one of the supplies of the lower tier and means to project said feeler into engagement directly with the lever 39 when the yarn slacks unduly, a rocker in the turret operative to engage the lever 39, and a feeler 58 to actuate the rocker normally restrained from such action by a yarn from a supply of the upper tier.

17. In a stop device for braiding machines, the combination with the rotating turret 2 and the two tiers of supplies thereon oppositely revolved about the machine's axis, of a non-rotating brake ring, a lever 39 to operate the brake ring, a rocker and connections to operate the lever and with an arm 52 with a shoulder 53, a feeler controlled by a yarn from a supply of the upper tier which in one direction of movement engages the arm 52 to operate the rocker and in an opposite direction of movement encounters the shoulder 53 and wipes over the arm of the rocker without action.

In testimony whereof I affix my signature in presence of two witnesses.

SIMON W. WARDWELL.

Witnesses:
GRACE N. BROWN,
JAMES F. McENERY.

Copies of this patent may be obtained for five cents each, by addressing the "Commissioner of Patents, Washington, D. C."

---

It is hereby certified that in Letters Patent No. 1,007,904, granted November 7, 1911, upon the application of Simon W. Wardwell, of Providence, Rhode Island, for an improvement in "Stop Devices for Braiding-Machines," an error appears in the printed specification requiring correction as follows: Page 3, line 129, for the word "spindles" read *supplies;* and that the said Letters Patent should be read with this correction therein that the same may conform to the record of the case in the Patent Office.

Signed and sealed this 12th day of December, A. D., 1911.

[SEAL.]

E. B. MOORE,
*Commissioner of Patents.* the combination with the rotating turret 2 and the two tiers of supplies thereon oppositely revolved about the machine's axis, of a non-rotating brake ring, a lever 39 to operate the brake ring, a rocker and connections to operate the lever and with an arm 52 with a shoulder 53, a feeler controlled by a yarn from a supply of the upper tier which in one direction of movement engages the arm 52 to operate the rocker and in an opposite direction of movement encounters the shoulder 53 and wipes over the arm of the rocker without action.

In testimony whereof I affix my signature in presence of two witnesses.

SIMON W. WARDWELL.

Witnesses:
GRACE N. BROWN,
JAMES F. McENERY.

Copies of this patent may be obtained for five cents each, by addressing the "Commissioner of Patents, Washington, D. C."

---

It is hereby certified that in Letters Patent No. 1,007,904, granted November 7, 1911, upon the application of Simon W. Wardwell, of Providence, Rhode Island, for an improvement in "Stop Devices for Braiding-Machines," an error appears in the printed specification requiring correction as follows: Page 3, line 129, for the word "spindles" read *supplies;* and that the said Letters Patent should be read with this correction therein that the same may conform to the record of the case in the Patent Office.

Signed and sealed this 12th day of December, A. D., 1911.

[SEAL.]

E. B. MOORE,
*Commissioner of Patents.*

It is hereby certified that in Letters Patent No. 1,007,904, granted November 7, 1911, upon the application of Simon W. Wardwell, of Providence, Rhode Island, for an improvement in "Stop Devices for Braiding-Machines," an error appears in the printed specification requiring correction as follows: Page 3, line 129, for the word "spindles" read *supplies;* and that the said Letters Patent should be read with this correction therein that the same may conform to the record of the case in the Patent Office.

Signed and sealed this 12th day of December, A. D., 1911.

[SEAL.]

E. B. MOORE,
*Commissioner of Patents.*